US006032517A

United States Patent [19]

Reisig et al.

[11] Patent Number: 6,032,517

[45] Date of Patent: Mar. 7, 2000

[54] DEVICE AND PROCESS FOR MEASURING THE RIGIDITY OF FLAT MAIL

[75] Inventors: Juergen Reisig; Christel Gehl, both of Berlin, Germany

[73] Assignee: Siemens Aktiengesellschaft, Munich, Germany

[21] Appl. No.: 09/066,290

[22] PCT Filed: Dec. 20, 1996

[86] PCT No.: PCT/EP96/05762

§ 371 Date: May 1, 1998

§ 102(e) Date: May 1, 1998

[87] PCT Pub. No.: WO97/25162

PCT Pub. Date: Jul. 17, 1997

[30] Foreign Application Priority Data

Jan. 5, 1996 [DE] Germany ........................... 196 00 231

[51] Int. Cl.[7] ........................................ G01N 3/40

[52] U.S. Cl. ........................................ 73/78; 73/37.7

[58] Field of Search ............................ 73/78, 865.8, 597, 73/601, 628, 598, 37.5, 37.6, 37.7; 209/598

[56] References Cited

U.S. PATENT DOCUMENTS

| | | | |
|---|---|---|---|
| 4,360,108 | 11/1982 | Logothetis . | |
| 4,398,421 | 8/1983 | White | 73/597 |
| 4,850,491 | 7/1989 | Schultz . | |
| 5,147,169 | 9/1992 | Miller et al. | 414/403 |
| 5,182,722 | 1/1993 | Hain . | |
| 5,637,811 | 6/1997 | Simard et al. | 73/865.8 |

FOREIGN PATENT DOCUMENTS

| | | |
|---|---|---|
| 0 129 280 | 12/1984 | European Pat. Off. . |
| 0 470 808 | 2/1992 | European Pat. Off. . |
| 4216146 | 12/1993 | Germany . |
| 94/04378 | 3/1994 | WIPO . |

*Primary Examiner*—Max Noori
*Attorney, Agent, or Firm*—Venable; George Spencer; Norman Kunitz

[57] ABSTRACT

An arrangement for measuring the rigidity of flat items with the aid of a conveying path in which the items are transported separately by means of conveying belts, wherein the conveying path has a straight section and a curved section and wherein the conveying belts are made of an eleastic material in the region of the curved section and at least one rigidity sensor is provided for measuring the deflection of the conveying belts caused by the item passing through a predetermined position of the curved section, and further including at least one thickness sensor in the region of the straight section, and an evaluation device is provided for determining the rigidity of an item passing through from the values obtained by the thickness and rigidity sensors.

11 Claims, 3 Drawing Sheets

DEVICE AND PROCESS FOR MEASURING THE RIGIDITY OF FLAT MAIL

BACKGROUND OF THE INVENTION

The invention relates to an arrangement and a method for measuring the rigidity of flat items according to the preamble of the independent patent claims.

It is necessary for the processing of letters, postcards and similar flat items in automatic letter sorting systems to measure the rigidity and the thickness of the items, because these letter sorting systems can only properly process items having specific predetermined parameters. In principle, such measurements can be carried out mechanically by means of a lever with a feeler roller and an inductive sensor. But at high transport speeds of, e. g., greater than 2.9 m/s, undesirable vibrations occur, so that rigidity and thickness cannot be determined accurately and separately with this functional principle. Moreover, a mechanical rigidity measurement requires much space and, like all mechanical arrangements, it is subject to increased wear. The aforesaid applies, in particular, to objects with uneven thickness or rigidity.

SUMMARY OF THE INVENTION

Therefore, it is the object of the present invention to propose an arrangement and a method with which a more precise rigidity measurement can be carried out on flat items. This object is solved by the features of the independent claims. Advantageous embodiments of the invention ensue from the dependent claims as well as from the description.

Compared to a mechanical rigidity measurement, the procedure according to the invention offers the advantage of a smaller space requirement, less wear and greater accuracy. It is possible, in particular, to also measure objects of uneven thickness and rigidity accurately.

BRIEF DESCRIPTION OF THE DRAWINGS

In the following, the invention is explained in greater detail by way of drawings. The figures show.

DETAILED DESCRIPTION OF THE INVENTION

Figure 1:
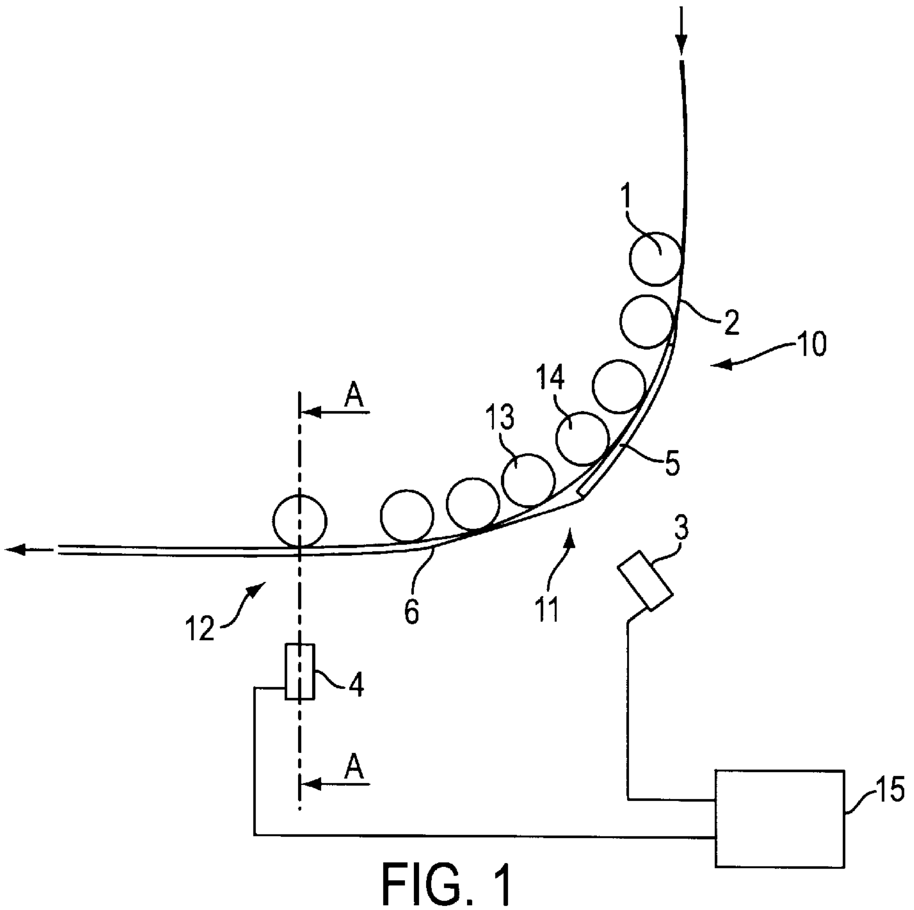
FIG. 1 a schematic representation of an arrangement according to the invention from on top, FIG. 2 a section along the axis A—A of FIG. 1, FIGS. 3–5 output signals of distance measurements for flat items of different rigidity and thickness, FIG. 6 the influence of the belt tension for a letter which is too rigid.

FIG. 1 illustrates a schematic representation of an arrangement according to the invention from on top, i. e., perpendicularly to the surface of the flat items 5 and 6. Conveying belts 2 are guided over a plurality of rollers 1, thus forming a conveying path 10. The conveying belts 2 are configured as twin bands, with the items being held between them in a nonpositive manner. The conveying path has at least one curved section 11 as well as at least one straight section 12. A rigidity sensor 3 is arranged in the region of the curved section, a thickness sensor 4 is arranged in the region of the straight section. The flat items are conveyed in the conveying path 10 in the direction of the arrow. The conveying belts are configured to be elastic and adjust to the thickness of the item. In the curved section, the rigidity of a flat item 5 causes an additional deflection of the outer belts during conveyance, in particular in the vicinity of the front and rear edges if the item. In the straight section of the conveying path, only the thickness of the system conveying belts/item changes according to the thickness of the item 6.

Figure 2:
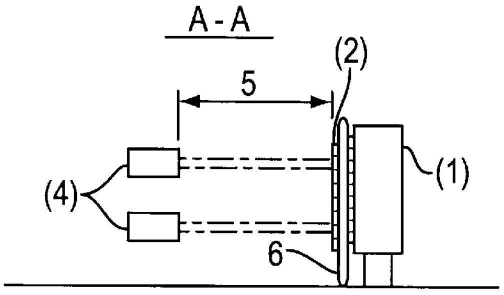

FIG. 2 illustrates the cut A—A of FIG. 1. Two thickness sensors 4, which are arranged one on top of the other, measure the actual thickness of the system conveying belts/flat item substantially perpendicularly to the direction of conveyance of the item 6. According to the invention, a laser, infrared or ultrasound scanning sensor is provided as a thickness sensor. Such scanning sensors preferably measure the change of the distance s through interference. For high speeds and high measuring accuracy, laser scanning sensors are preferred. A laser, infrared or ultrasound scanning sensor is also used as rigidity sensor 3 which detects the change of the distance based on the rigidity of the flat items 5. Thickness sensor and rigidity sensor for determining the rigidity of the item that is passing through are connected to an evaluation device 15 whose mode of operation is described below in detail.

As illustrated in FIG. 2, preferably a plurality of thickness and rigidity sensors are arranged one on top of the other which sensors permit an evaluation of the item over the entire height of the item. The measurement of the thickness or of the rigidity is preferably carried out by sensor pairs, respectively at the same level of the items. It is preferred to arrange the rigidity and thickness sensors in the region of the lower edge of the items. In this manner, it is also possible to recognize enclosures such as, e.g., keys.

As is shown in FIG. 1, rigidity sensors are arranged in the curved region 11, preferably in such a manner that the deflection of the outer conveying belts can be measured in the region between a first and a second deflecting roller 13, 14.

Figure 3:
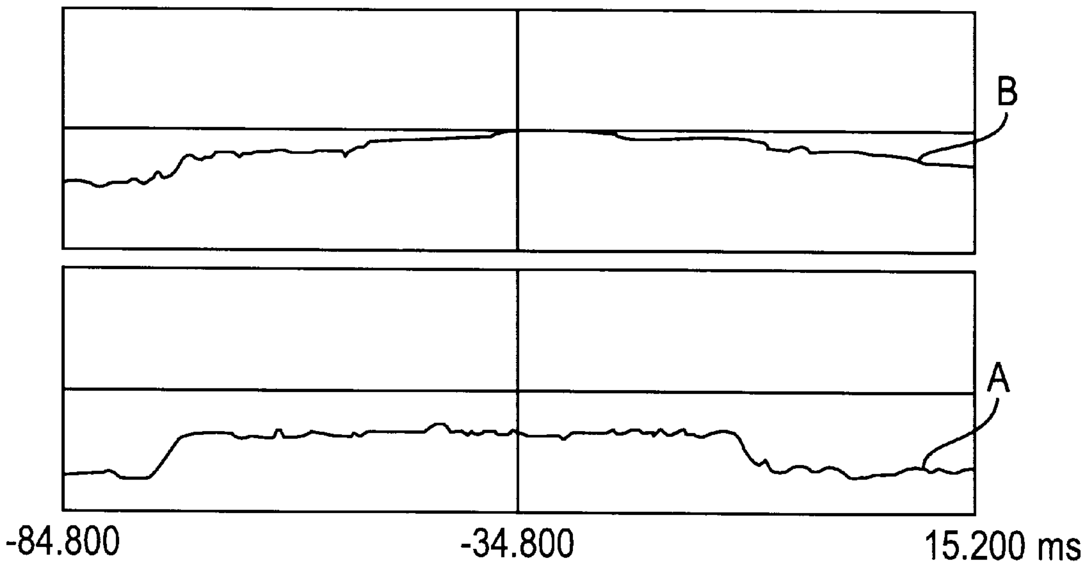

The evaluation device 15 determines a measure for the rigidity of an item passing the thickness and rigidity sensors from the measured values supplied by the thickness and rigidity sensors in the following manner:

FIG. 3 illustrates the course of the output signals of thickness or rigidity sensors (a or b) over time in a time window for a flat item having an admissible rigidity and thickness. FIG. 3 shows that, centered around the time of −34.8 ms in the time window, an increase in thickness (curve a) and an increased deflection (curve b) was measured.

Figure 4:
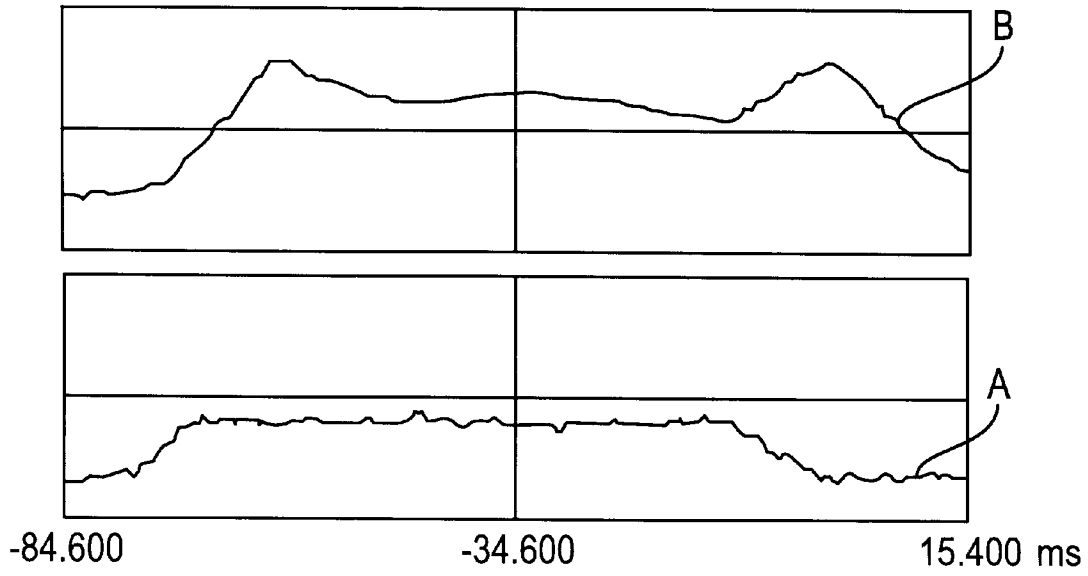

Corresponding to FIG. 3, FIG. 4 shows measuring values for a letter having an admissible thickness and too much rigidity. The method for measuring the rigidity according to the invention then sums up the values measured by the thickness sensor within a predetermined time window $\Delta t1$. The values measured by the rigidity sensor are also summed up within a predetermined time window $\Delta t2$. Preferably, the two time windows $\Delta t1$ and $\Delta t2$ are selected to be identical in size. Then, the difference is formed between the sum of the rigidity values and the sum of the thickness values. This difference is used as a measure for the rigidity measurement. Compared to a method which uses only the extreme values, the probability of a misinterpretation is much lower. Moreover, this method also provides definitive results even for borderline cases.

Figure 5:
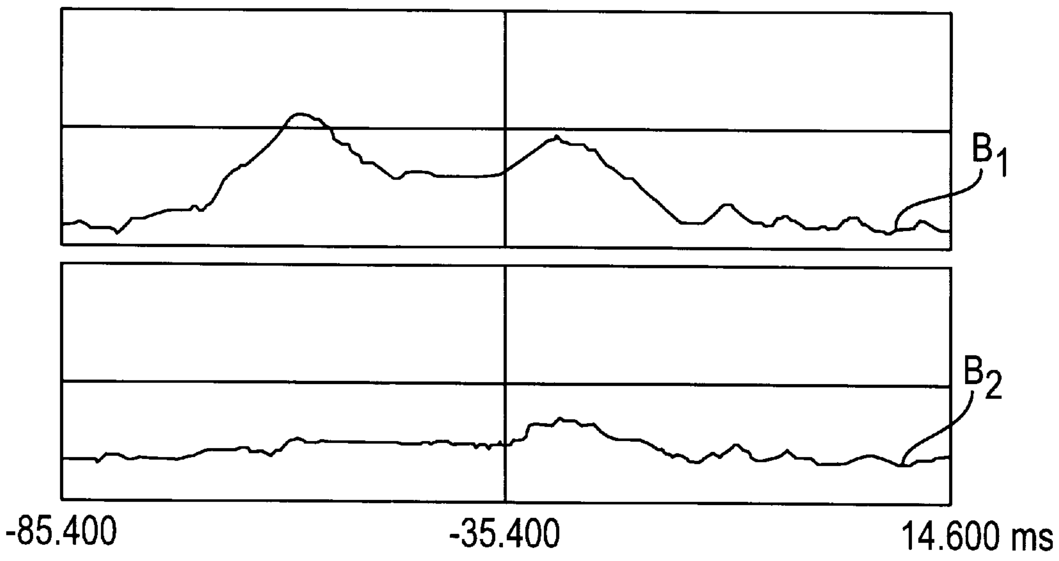

FIG. 5 illustrates the measurement results of two rigidity sensors b1 and b2 for a letter with an enclosure at the bottom. Curve b1 corresponds to the measured values of a sensor arranged in the region of the bottom edge of the letter; curve b2 corresponds to the values of a rigidity sensor arranged in the center region. Here, the curve b1 clearly shows maxima which point to the rigidity increased by the enclosure, whereas curve b2 does not have such maxima.

Accordingly, in a preferred embodiment of the invention, a plurality of sensors for measuring rigidity and thickness are substantially arranged over the entire height of the conveying belts.

In order to obtain a measure for the rigidity of an item with inhomogeneities, the invention provides to determine the maximum difference of the summed-up values for a plurality of pairs of thickness and rigidity sensors and to use the maximum as a measure for the rigidity.

Figure 6:
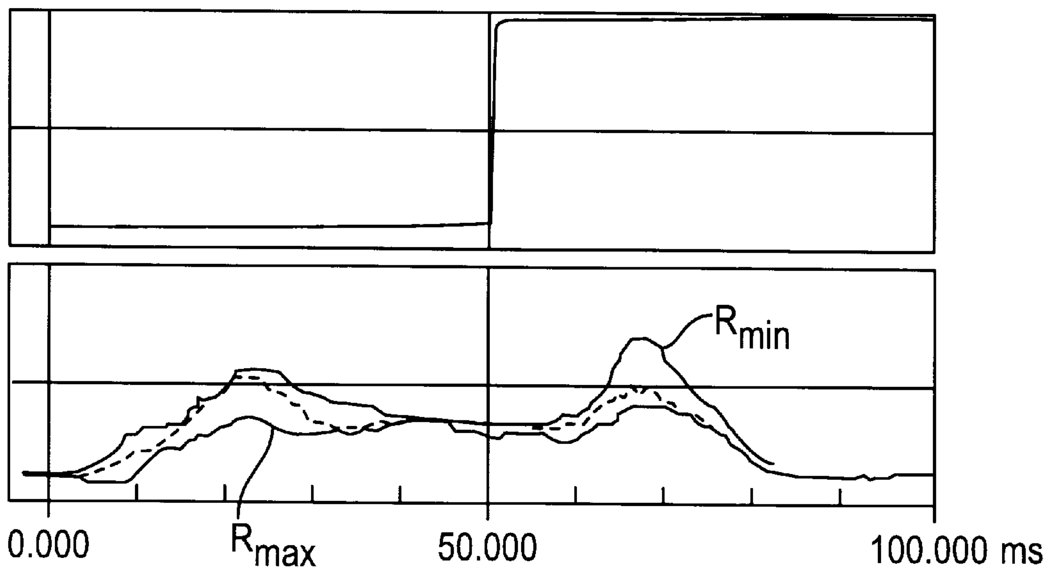

FIG. 6 illustrates the influence of the belt tension on the deflection of the conveying belts. It is discernible that the maxima of the curve of the rigidity measurements decrease as the belt tension increases and, vice versa, the maxima increase as the belt tension decreases.

It goes without saying for the person skilled in the art to consider this dependence of the measured values on the belt tension for the design of concrete parameters of the arrangement according to the invention as well as of the corresponding method. Furthermore, it goes without saying for the person skilled in the art to predetermine a plurality of difference intervals of the sums of rigidity and thickness values in such a manner that a qualitative evaluation of the rigidity of flat items takes place based on the interval into which falls the respectively determined difference of the sums of rigidity or thickness values. In the simplest case, a maximum value is determined, so that the item is classified as being too rigid if the difference values are above this value, the item is classified as being within the admissible rigidity if the differences are below this value.

What is claimed is:

1. An arrangement for measuring the rigidity of flat items including a conveying path, in which the items are transported individually by conveying belts, and wherein the conveying path has a straight section and, in the region of this straight section, at least one thickness sensor is provided, the conveying path has a curved section and, in the region of this curved section, the conveying belts are configured to be elastic and at least one rigidity sensor is provided with which the deflection of the conveying belts caused by an item that is passing through is measured in a predetermined position of the curved section, and an evaluation device is provided for determining the rigidity of an item that is passing through from the values of the thickness and rigidity sensors.

2. An arrangement according to claim 1, wherein laser, infrared or ultrasound scanning sensors are provided as thickness sensors and as rigidity sensors.

3. An arrangement according to claim 1, wherein the thickness and rigidity sensors are arranged at a substantially the same height relative to the conveying path, so that a measurement of the thickness of the item and a measurement of the rigidity of the item are taken at substantially a same height on the item.

4. An arrangement according to claim 3, wherein the thickness and rigidity sensors are arranged such that the measurements are taken close to a bottom edge of the items that are passing through.

5. An arrangement according to claim 3, wherein a plurality of thickness sensors are arranged in increasing heights relative to the conveying path and a plurality of rigidity sensors are arranged in increasing heights relative to the conveying path and substantially equal to the heights of the thickness sensors, and an evaluation takes place using pairs of the measured values of thickness and rigidity, which are measured at substantially the same height on the items.

6. An arrangement according to claim 1, wherein, in the curved section, the conveying belts are guided by a plurality of rollers.

7. An arrangement according to claim 6, wherein the rigidity sensor/s are arranged in such a manner that the deflection of the conveying belts is measured in the region between a first and a second deflection roller.

8. A method for measuring the rigidity of flat items by means of one or several thickness and rigidity sensors, wherein, for an item guided past the thickness and rigidity sensors, the values measured by the thickness sensor/s are summed up within a predetermined time window $\Delta t1$, the values measured by the rigidity sensor/s are summed up within a predetermined time window $\Delta t2$, and for a predetermined pair of thickness and rigidity sensors, the difference between the summed-up values is formed and used as a measure for the rigidity of the items that are guided past.

9. A method according to claim 8, wherein a check is carried out to determine into which interval out of a predetermined number of intervals the difference falls.

10. A method according to claims 8, wherein a plurality of pairs of thickness and rigidity sensors determines the maximum difference and uses it as a measure for rigidity.

11. An arrangement for measuring the rigidity of flat items by use of a conveying path in which the items are transported individually, the conveying path comprising:

at least one conveying belt, for propelling the individual item along the conveying path;

a straight section of conveying path;

at least one thickness sensor, located in the vicinity of the straight section, for measuring the thickness of the individual items;

a curved section of conveying path, wherein the at least one conveying belt is configured to be elastic and is deflected by an item passing around the curved section;

at least one rigidity sensor, located in the vicinity of the curved section, for measuring the deflection of the conveying belt caused by an item that is passing through a predetermined position of the curved section; and an evaluation device for determining the rigidity of an item that is passing through from the values measured by the thickness and rigidity sensors.

* * * * *